R. WIDMANN.
PROCESS FOR PREPARING PHOTOGRAPHIC PICTURES.
APPLICATION FILED MAY 27, 1909.
962,484.
Patented June 28, 1910.
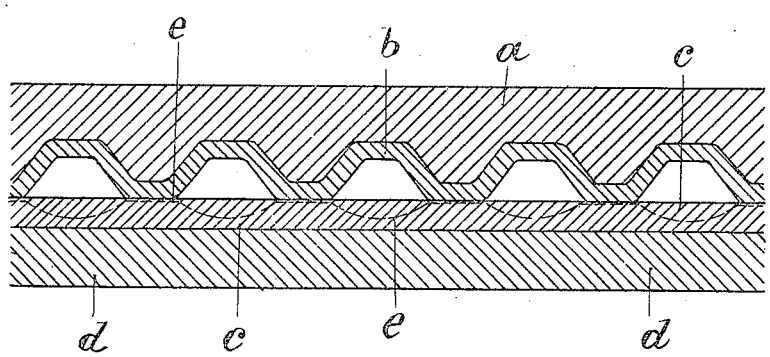
Witnesses:-
Inventor:-
Rudolf Widmann
by
his Attorneys

UNITED STATES PATENT OFFICE.

RUDOLF WIDMANN, OF MUNICH, GERMANY.

PROCESS FOR PREPARING PHOTOGRAPHIC PICTURES.

962,484.
Specification of Letters Patent. Patented June 28, 1910.

Application filed May 27, 1909. Serial No. 498,676.

*To all whom it may concern:*

Be it known that I, RUDOLF WIDMANN, a citizen of Bavaria, residing at Munich, Bavaria, Germany, have invented certain new and useful Improvements in Processes for Preparing Photographic Pictures; and I do hereby declare the following to be a full, clear, and exact description of the invention, such as will enable others skilled in the art to which it appertains to make and use the same.

The present invention relates to an improvement in the art of photo engraving whereby printing upon a sensitized plate by direct contact with a negative may be effected.

The invention is especially applicable to the production of what is termed "half tone" work and resides essentially in the method of producing printing plates used for this purpose.

In practicing the invention the preferred method of proceeding is to provide upon one side of a photographic screen a layer of material sensitive to light so that this layer will have its surface divided to present alternately depressed and elevated units or elements. I then photograph the object directly upon the sensitized layer thereby producing a negative which may be used for printing by direct contact with a sensitized plate.

It will be understood that I am not confined to the use of a screen but may employ any medium which is transparent and has one surface thereof divided into adjacent elevated and depressed units or elements so that the sensitive layer is given a like form; the main object being to produce a light sensitive layer whose surface is divided into elements or units, whereby in taking the photograph the image will be produced on the light sensitive surface with varying degrees of intensity of tones uniform in the original, and in printing the degree to which these elements develop will vary with the character of the elements or units, the elevated units developing darker and more densely than the depressions.

The accompanying drawing shows an enlarged sectional view illustrative of the manner of printing from such a negative.

$a$ is the ruled screen, $b$ the negative image, $c$ the sensitive medium for printing on, for instance, a layer of chome gelatin, and $d$ the support or carrier for the latter, for instance, a metal plate. The line $e$ shows the amount of actinic action at different points. Below the hollows of the ruled screen or negative, the actinic action is much stronger than at those points where the units or single elements of the negative are in contact with the sensitive layer, since these latter during the original exposure received more light and were therefore subsequently more densely developed. In this way a developed chrome gelatin copy or print may be attained consisting of more strongly printed units and others less strongly printed, these latter lying deeper than the first-mentioned, and being therefore more amenable to the action of the mordant or etching fluid. Such developed chrome gelatin copies can be either used to prepare a galvanic form or may be themselves etched, giving then without special afterwork good blocks.

In place of glass screens, it may be advantageous to use screens of celluloid or gelatin, cast or pressed and coated with the sensitive photographic emulsion, or suitable layers having a relief-like screen surface may be used, for instance, in the form of films.

In order to still further increase the contrasting action of the two series of surface units, screens may be used in which the elevated portions are matte or colored, the hollows being quite transparent. This coloring or the like should only weaken the actinic action of the light but not stop it altogether. The screen units may be made matte or colored in the case of glass screens, for instance, by burning in vitrifiable pigments or by etching the screen with the help of suitable cover glasses. Sensitive layers with a relief-like surface may be formed by first pouring a colored photographic emulsion into the hollows of the screen form and when dry coating with a colorless emulsion, so that the developed film will contain on the one hand elements or units admitting of a stronger actinic action and on the other hand colored elements which decrease the actinic action as compared with the former. Or instead of coloring, the surface may be made matte. Another method consists in making matte or coloring the hollow elements of the screen, which will then tend to decrease the actinic action during printing.

In this case the raised units of the negative will print normally, similar to an ordinary negative, while the matte or colored elements will admit of only a decreased actinic action. The coloring of the hollow elements of the negative can also be subsequently performed in known manner.

What I claim as my invention, and desire to secure by Letters Patent, is:

1. The herein described improvement in the art of photo-engraving, which consists in forming one surface of a transparent screen into alternately depressed and elevated units, coating said surface with light sensitive material, photographing an object directly on said light sensitive material to produce a negative and then printing by direct contact between such negative and a sensitized plate.

2. The herein described improvement in the art of photo-engraving which consists in forming one surface of a transparent screen into alternately depressed and elevated units, making certain units thereof less transparent than others, coating said surface with light sensitive material, photographing an object directly on said light sensitive material to produce a negative, and then printing by direct contact between such negative and a sensitized plate.

3. The herein described improvement in the art of photo-engraving which consists in forming one surface of a transparent screen into alternately depressed and elevated units, coloring certain of said units, coating said surface with light sensitive material, photographing an object directly on said light sensitive material to produce a negative, and then printing by direct contact between such negative and a sensitized plate.

4. As a new article of manufacture, a transparent photographic screen having one of its sides coated with a layer of material sensitive to light and adapted to have an object photographed thereon, the surface of said layer presenting adjacent depressed and elevated substantially plane units or elements.

5. As a new article of manufacture, a photographic screen having one of its sides coated with a layer of material sensitive to light and adapted to have an object photographed thereon, the surface of said layer being of different degrees of transparency and divided into adjacent depressed and elevated substantially plane units or elements.

6. As a new article of manufacture, a transparent photographic screen, having one of its sides coated with a layer of material sensitive to light and adapted to have an object photographed thereon, the surface of said layer presenting adjacent depressed and elevated units or elements, certain of said units or elements being colored.

7. As a new article of manufacture, a transparent film adapted to have an object photographed directly thereon, said film having a surface divided into adjacent depressed and elevated units or elements of uniform size and parallel to each other.

8. As a new article of manufacture, a transparent film adapted to have an object photographed directly thereon, the surface of said film being of different degrees of transparency and divided into adjacent depressed and elevated units or elements of uniform size and parallel to each other.

9. As a new article of manufacture, a transparent film adapted to have an object photographed directly thereon, the surface of said film presenting adjacent depressed and elevated units or elements and certain of said units or elements being colored.

10. As a new article of manufacture, a transparent photographic screen having one of its sides coated with a layer of material sensitive to light and adapted to have an object photographed directly thereon, the surface of said layer being divided into adjacent depressed and elevated units or elements of uniform size and parallel to each other.

11. As a new article of manufacture, a transparent photographic screen having one of its sides coated with a layer of material sensitive to light and adapted to have an object photographed directly thereon, the surface of said layer being of different degrees of transparency and divided into adjacent depressed and elevated units or elements of uniform size and parallel to each other.

In testimony whereof I hereunto affix my signature in the presence of two witnesses.

RUDOLF WIDMANN.

Witnesses:
ABRAHAM SCHLESINGER,
LOUIS I. MUELLER.